July 25, 1950
H. F. VICKERS ET AL
2,516,662
POWER TRANSMISSION
Filed June 10, 1946
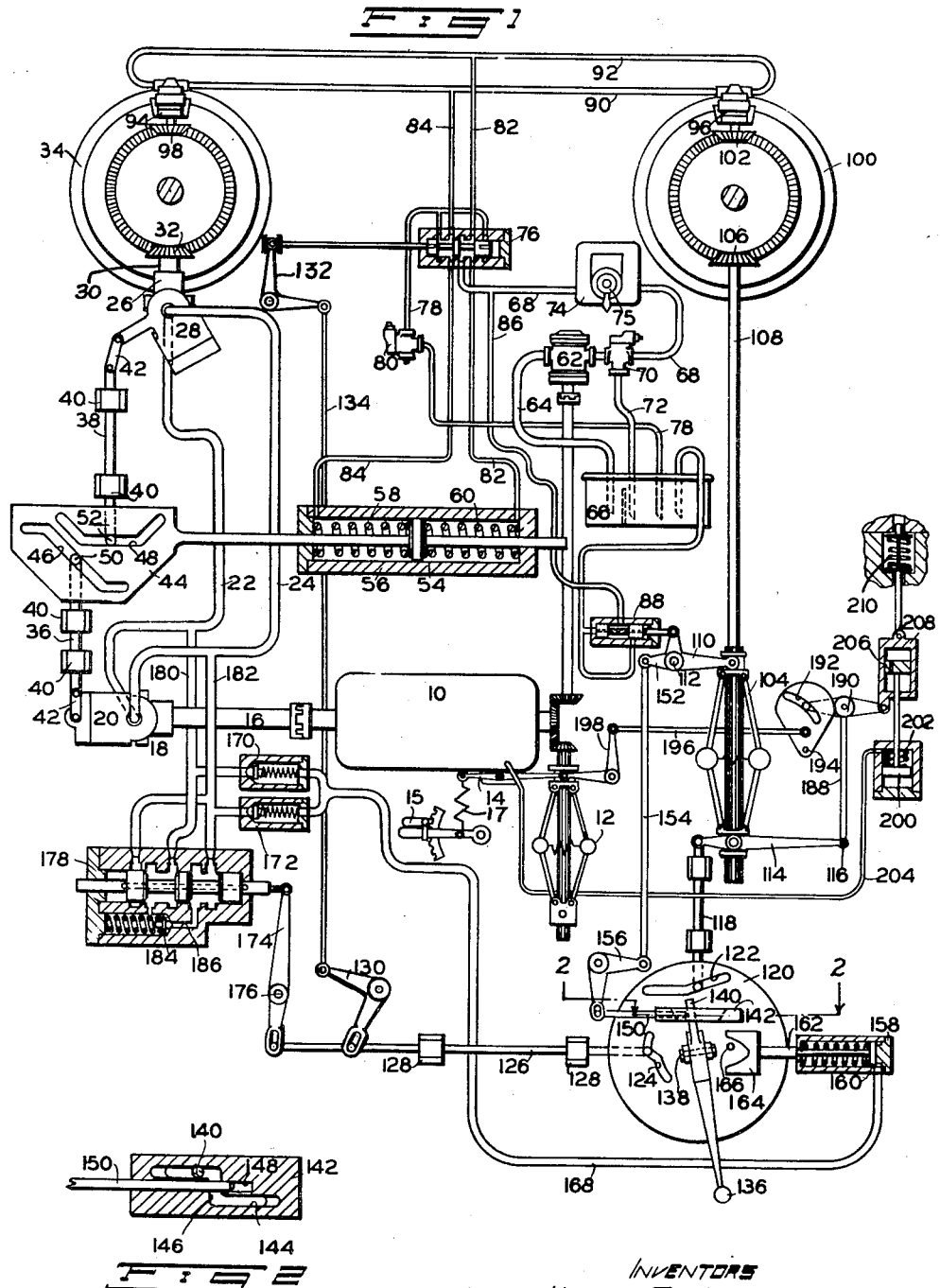

Patented July 25, 1950

2,516,662

UNITED STATES PATENT OFFICE 2,516,662

POWER TRANSMISSION

Harry F. Vickers, Detroit, Kenneth R. Herman, Franklin, and Walter M. Pohl, Birmingham, Mich., assignors to Vickers Incorporated, Detroit, Mich., a corporation of Michigan Application June 10, 1946, Serial No. 675,805

8 Claims. (Cl. 105—64)

This invention relates to power transmissions, particularly to those of the type comprising two or more fluid pressure energy translating devices, one of which may function as a pump and another as a fluid motor.

The invention is more particularly concerned with a hydraulic power and control system adapted for use on vehicles and especially to such vehicles as switching and mine locomotives having an internal combustion engine prime mover. There have been many proposals and attempts to provide motor vehicles of this class with infinitely variable hydraulic transmissions and with various automatic and semi-automatic systems for controlling the speed ratio to meet the wide variety of operating conditions encountered.

It is an object of the present invention to provide an improved power and control system which requires an absolute minimum of skill on the part of the operator and which may be manually set to produce automatically any desired vehicle speed and vehicle acceleration.

Another object is to provide in a system of this character automatic supervisory controls which do not normally affect the operation of the manual controls but which when certain operating limits are exceeded, for example, the power capacity of the prime mover or the tractive capacity of the vehicle wheels will take over control of the transmission to maintain its output below selected limits.

Another object is to provide in a system of this character a speed regulating control which is free from hunting and which is compensated to correct for changes in prime mover speed and loads.

It is also an object of the present invention to provide a system having an improved means of enabling the vehicle to freewheel in either direction in addition to providing an open by-pass across the main circuit when the controls are in neutral position.

Another object of the present invention is to provide a control system of this character wherein automatic speed responsive means are provided for preventing reversal of the controls under conditions where sudden reversal would overload the mechanism.

Further objects and advantages of the present invention will be apparent from the following description, reference being had to the accompanying drawing wherein a preferred form of the present invention is clearly shown.

In the drawing:

Figure 1 is a diagrammatic view of a power transmission and control system embodying a preferred form of the present invention.

Figure 2 is a fragmentary sectional view taken on line 2—2 of Figure 1.

In the system illustrated, 10 represents a prime mover of the internal combustion engine type having a speed responsive governor 12 connected to actuate the usual fuel control by a lever 14. The governed speed of the engine may be manually adjusted by any suitable controller such as the hand lever 15 adjusting the spring 17 acting on the lever 14. The engine 10 has its output shaft 16 connected to drive a reversible variable displacement pump 18 having a yoke 20 which may be angularly adjusted to vary the direction and volumetric rate of fluid delivery by the pump. The pump 18 is connected by main fluid circuit conduits 22 and 24 to a variable displacement fluid motor 26. The latter may be provided with a swinging yoke 28 which may be angularly adjusted to change its displacement per revolution over a substantial range, for example, two to one, without, however, reversing the relation between fluid flow and shaft rotation. The output shaft 30 may be connected by suitable gearing 32 to the driving wheel or wheels 34 of the vehicle.

The pump and motor yokes 20 and 28 are provided with slidable control rods 36 and 38 mounted in bearings 40 and connected to the yokes by links 42. The control rods 36 and 38 may be actuated in correlated relation by any suitable means, that illustrated comprising a horizontally shiftable cam 44 having slots 46 and 48 adapted to coact with followers 50 and 52 carried by the ends of the control rods. The cam slots are so arranged that, when the cam 44 is in the neutral position illustrated, yoke 20 is maintained in neutral position and yoke 28 in its maximum displacement position. Upon displacement of cam 44 to the left or right, yoke 20 is first shifted gradually downwardly or upwardly to its maximum displacement position while yoke 28 remains unchanged. Further movement of the cam 44 holds the yoke 20 in position and swings the yoke 28 toward a position of reduced displacement. The cam 44 thus constitutes a single member for varying the speed ratio and the direction of power transmission between the pump and motor. The cam 44 is adapted to be positioned by a hydraulic actuator 54 comprising a piston slidable within a cylinder 56 and normally biased to center position by high rate springs 58 and 60. Thus, whenever fluid under pressure is admitted to one end of the cylinder 56, the spring in the opposite end will be compressed to a degree depending upon the pressure value maintained in the one end of the cylinder.

For the purpose of supplying and controlling the admission of fluid to the actuator 54, there is provided a pilot hydraulic system comprising a fluid displacement pump 62 driven from the engine 10 and having a suction conduit 64 connected to a fluid reservoir 66. The delivery conduit 68, provided with the usual relief valve 70 and relief conduit 72, has an adjustable compensated flow control valve 74 therein and leads to the inlet port of a four-way reverse valve 76. The valve 74 is preferably of the type which maintains any desired flow rate independently of the pressure conditions, the rate being adjustable by a dial 75. The return line 78 from the reverse valve 76 leads through a pressure responsive backpressure valve 80 to the tank 66. The valve 76 is connected to the actuator 54 by conduits 82 and 84. Connected to the delivery line 68 by a branch conduit 86 is a bleed valve 88 which when open by-passes the delivery of pump 62 back to the tank 66. The valve 88, while not responsive to operating pressure in conduit 68 because it is hydraulically balanced, is nevertheless arranged to be variably opened and closed to regulate that pressure by the action of certain automatic and manual control means later to be described.

The conduits 82 and 84 for the actuator 54 extend upwardly beyond the valve 76 where they are connected in parallel with a closed loop circuit 90—92 having a pair of fluid pumps 94 and 96 connected in series therein. The pump 94 is driven from the driving wheel 34 by suitable gearing 98 while the pump 96 is driven from a free rolling idler wheel 100 by suitable gearing 102. The pumps 94 and 96 are of equal displacement and driven at the same speed from their respective wheels so that, if the driving wheel 34 maintains rolling traction contact without slipping, fluid will be circulated idly through the loop circuit 90—92 with no flow taking place into or out of the conduits 82 and 84.

The control of the bleed valve 88 is primarily in response to vehicle speed and for this purpose a speed governor 104 may be driven from the idler wheel 100 by gearing 106 and shaft 108. The governor 104 adjusts the valve 88 through the medium of a T-shaped lever 110 fulcrumed at 112 and is so arranged that an increase in speed tends to open the valve 88 and vice versa. The governor 104 is subject to manual adjustment of its responsive speed and for this purpose its lower end is arranged to be slid upwardly and downwardly on the shaft 108 under the control of a lever 114 having an adjustable fulcrum 116 and a control rod 118 which is manually operated by a cam 120. When the cam 120 is in its neutral position slightly clockwise from the position shown, the rod 118 is at its lowest position in which the speed governor 104 holds the valve 88 open at zero speed. Rotation of the cam 120 to either side of its neutral position progressively raises the rod 18 through the action of the cam slot 122.

The cam 120 has a second cam slot 124 having a steep rise portion adjacent the neutral position and with circular dwell portions for a considerable arc either side thereof. Cam slot 124 controls a rod 126 horizontally shiftable in bearings 128 and connected by bellcranks 130 and 132 and link 134 to the shiftable spool of reverse valve 76. The action is such that on slight movement from neutral position of cam 120, the valve 76 is shifted to either of its extreme positions depending upon the direction of movement of cam 120. The cam 120 is provided with a handle 136 by which the cam may be rotated about its axis. The handle 136 is pivoted on a transverse axis 138 for movement toward and away from the plane of the drawing and has an upward extension 140 which projects through a stationary plate 142.

The plate 142 (see Figure 2) is provided with a zig-zag slot 144 with a central vertical portion 146 through which the handle extension may be moved laterally when in neutral position. The plate 142 is provided with a bore 148 intersecting the portion 146 and a pin 150 is slidable in the bore to selectively block movement of the handle extension 140 from one side to the other of neutral position. Pin 150 is controlled by governor 104 by the extension 152 of lever 110, link 154 and bellcrank 156.

For the purpose of supervising the operation of lever 136 to prevent the power capacity of engine 10 from being exceeded, there is provided a horsepower limiter comprising a cylinder 158 having a spring-loaded piston 160 therein, the rod 162 of which carries a hyperbolic cam 164. In the spring retracted position of piston 160, the cam 164 permits free rotation of cam 120 through its full stroke in either direction. When the cam 164 is projected to the left it coacts with a pin 166 carried by cam 120 to limit the possible angular movement of cam 120. The curvature of cam 164 is such that the farther the cam is projected to the left, the smaller is the possible arc of movement of cam 120, the relationship between the two preferably being a hyperbolic function. The cylinder 158 is connected to the main circuit lines by a conduit 168 which connects with lines 22 and 24 through check valves 170 and 172, respectively. Thus the line 168 receives fluid from whichever one of the main circuit lines happens to be at the higher pressure at any given moment and the piston 160 moves to the left in proportion to the fluid pressure in line 168.

For the purpose of providing a positive neutral and also a free-wheeling action there is provided a neutral by-pass and free-wheeling control which may be actuated from the cam 120 by rod 126. For this purpose, a lever 174 is fulcrumed at 176 to operate the spool of a four-way reverse valve 178. The latter is connected across the main circuit lines 22 and 24 by branch conduits 180 and 182 and the internal porting and lands of the spool are so proportioned that when in central position, the branch conduits 180 and 182 are open to each other. In the body of the valve 178 is a check valve 184, the inlet 186 of which is adapted to be selectively connected with conduit 180 or 182 depending upon which of the two extreme positions the spool of valve 178 occupies.

The adjustable fulcrum 116 of the lever 114 is adapted to be controlled in response to the speed and load conditions at the prime mover 10. For this purpose, fulcrum 116 is connected by a link 188 to a floating lever 190. The left end of the lever 190 is operated by a cam 192 pivoted at 194 and actuated from the speed regulator 12 by a link 196 and bellcrank 198. The righthand end of lever 190 is operated from a spring-loaded piston 200 slidable in a cylinder 202, the upper end of which is connected to the intake manifold of the engine through a conduit 204. The piston 200 is connected to lever 190 by a lost motion connection comprising a dashpot piston 206 slidable in a cylinder 208 which is pivotally attached to the lever 190. A centering spring 210 serves to normally maintain the righthand end of lever 190 in a centered position but permits the same to move upwardly or downwardly when there is a change in the position of piston 200 more rapid than the dashpot will accommodate without yielding.

In operation, with the engine 10 running and with the speed adjustment lever 136 moved from neutral to the position shown on the drawing, this movement will have positioned the valves 76 and 178 to the left and right, respectively, as shown, this action having been caused by the cam slot 124 acting through the rod 126 and linkages 130, 132, 134 and 174. The remaining parts on the drawing are shown in the positions they would occupy for an instant after lever 136 is shifted and before the automatic controls have caused the vehicle to start in motion. Movement of the cam 120 also shifted the speed governor 104 bodily upward on shaft 108 and through lever 110 closed the bleed valve 88. This causes the entire quantity of fluid passed by flow control valve 74 to be delivered from pump 62 into the righthand end of cylinder 56 through passage 68, valve 76 and passage 82. Piston 54 is accordingly shifted to the left and the cam 44, through the action of slot 46, moves the yoke 20 downwardly causing the delivery of pump 18 to increase proportionately. Oil is accordingly pumped from conduit 24 into conduit 22 which drives the fluid motor 28 in a direction which for the present purposes will be termed forward.

The speed of movement of piston 54 and cam 44 is determined by the adjustment of the flow regulating valve 74 and can be set to give any desired vehicle acceleration rate. As soon as the vehicle comes up to a speed corresponding to the setting of lever 136, the governor 104 will have pulled the lever 110 downwardly to partially open the bleed valve 88. When it has opened to the degree where the value of pressure in conduits 82, 68 and 86 will force the same quantity of oil through valve 88 as passes through valve 74, the piston 54 will stop moving and hold the cam 44 and yokes 20 and 28 in that adjusted position. The pressure maintained in conduits 82, 68 and 86 will depend, of course, upon the position of piston 54 and compression of the spring 58. It will be seen that the action is such as to automatically maintain the vehicle speed at a constant value since any increase above that value will tend to open valve 88 farther, thus permitting more oil to bleed out of line 68 than comes into it through the flow control 74 which will permit the piston 54 to move back slightly to the right and correspondingly reduce the displacement of pump 18 and speed of the vehicle. The opposite action will occur upon a decrease in speed.

The speed regulating action of governor 104 is further compensated for load variations as reflected at the engine 10. Assuming that the vehicle meets increased load resistance, as, for example, by entering an upgrade, then the subatmospheric pressure in the engine manifold will rise permitting the spring pressed piston 200 to move downwardly. If the rate of movement is sufficiently rapid, the dash-pot piston 206 will carry the cylinder 208 with it overcoming the action of centering spring 210 and shifting the righthand end of lever 190 downwardly which acts upon the adjustable fulcrum 116 to shift the lower end of speed governor 104 also downwardly thus tending to open the bleed valve 88 and permit piston 54 to shift back toward center. This temporarily reduces the speed ratio of the transmission 18 and 26, or, to put it another way, increases the mechanical advantage of the engine over the driving wheels and makes it possible for the engine 10 to more quickly pick up the additional load and come to a steady state without hunting of the speed governor 12. The centering spring 210 will in a small time interval restore the lever 190 to its centered position regardless of the position of piston 200, and the action just described is only a transitory condition occurring when there are rather rapid load changes.

Since the heavier load requires a larger opening of the fuel regulator 14, the speed governor 12 will govern the engine to a slightly lower speed. However, this effect would cause the vehicle to operate at a correspondingly reduced speed if the ratio of transmission remains the same as before. In order to compensate for this characteristic of the engine governor 12, the cam 192 will take up a new position clockwise from the position illustrated which in turn will raise the left end of lever 190 and the lower end of speed regulator 104. This has the effect of slightly closing the bleed valve 88 and causing the piston 54 to take up a new stable position slightly to the left of that occupied before the additional load was imposed. In this way, the speed of the vehicle is maintained at the same value regardless of load.

In the event that the setting of the flow regulator valve or acceleration control 74 should be too high for a slippery track condition, the supervisory control originating at pumps 94 and 96 will be brought into play. Thus, when the driving wheel 34 starts to slip, it will cause pump 94 to deliver oil into conduit 90 faster than pump 96 withdraws it therefrom and the difference will be delivered into conduit 84. Likewise, the deficiency in conduit 92 between the output of pump 96 and the intake of pump 94 will be delivered into conduit 92 through conduit 82. This counteracts the effect of the oil delivered from pump 62 through conduits 68 and 82 and retards the rate of acceleration of the vehicle or may even stop it completely by holding the piston 54 stationary. Thus accelerations of the driving wheel 34 are held down to a point where it cannot rotate ahead of the idler wheel 100 even though the controls be manually set for a higher rate of acceleration.

In the event that the acceleration rate set by the manual controls would exceed the power capacity of the prime mover 10, the horsepower limiting piston 160 comes into play and limits the maximum setting which can be given to the speed lever 136. This control also comes into play under conditions where the vehicle is operating at high speed under medium or light load and the load increases beyond the power capacity in the engine 10. In such event, the pressure from the main circuit line 22 in forward drive will be transmitted through check valve 170 and line 168 to the piston 160 and will positively force the cam 120 clockwise by the amount necessary to keep the horsepower requirement within the capabilities of engine 10. Similar action occurs also when the vehicle is operating in reverse.

It will be noted that the system provides control of acceleration rates by the mechanism above described and that it is ineffective to control deceleration. The latter type of control is unnecessary in view of the fact that the free wheeling check valve 184 is provided. Thus, in the event that the speed lever 136 should be suddenly shifted from a high speed setting to a neutral position, the system would not be overloaded in any way because the inertia of the vehicle will continue the motor 26 in operation as a pump. The excess fluid delivered into line 24 beyond that accepted therefrom by the pump 18 will pass through the branch 182, valve 178, check valve 184 and branch 180 back to the forward delivery line 22.

When the control lever 136 is set for reverse operation, valves 76 and 178 are shifted to their opposite position from those shown on the drawing. This has the effect of transferring delivery of pump 62 to the conduit 84 and left end of cylinder 56, thus producing the same type of control as previously described except that cam 44 is shifted to the right and cam slot 40 will raise the yoke 20 rather than lower it. This, of course, reverses the delivery condition in the main circuit 22—24 and causes the motor 28 to operate in the opposite direction. The shifting of valve 178 also transposes connection of check valve 184 with the branch conduits 180 and 182 so that it then becomes effective to block flow from conduit 24 to conduit 22 and permits free flow in the opposite direction.

While the check valve 184 prevents overloading of the mechanism in the event of sudden shifting of speed lever 136 from a high speed to a neutral position, it would be possible to dangerously overload the equipment with the controls thus far described if the lever were suddenly moved from high speed forward to high speed reverse for example. That is because the valve 178 reverses the connections of check valve 184 as the lever is moved through neutral which would have the effect of suddenly blocking the outlet path for the oil delivered by motor 26 (acting as a pump) into conduit 24. In order to prevent this, the neutral interlock pin 150 is held in the position shown in Figure 2 at all times when the vehicle speed is above a predetermined value. Thus, the extension 140 of the lever 136 is confined either to the upper portion of slot 144 (as shown in Figure 2) during forward operation or to the lower portion thereof during reverse operation. When the speed drops to a safe small value, the pin 150 becomes fully retracted, thus permitting transfer from the upper to the lower slot portion or vice versa. Preferably the speed at which pin 150 is fully retracted is such that it is possible to rapidly "rock" the vehicle forward and back where such action is desirable under bad traction condition.

In the form illustrated, the invention includes means for controlling not merely the displacement of the pump 18 but also that of the fluid motor 26. This has the effect of greatly increasing the range of speed ratios available with a given size of pump and motor combination since, when the full displacement of the pump 18 is reached, further increases in speed may be obtained by decreasing the displacement of the motor 26. This contributes materially to the economy of construction since smaller hydraulic units may be utilized.

While the form of embodiment of the invention as herein disclosed constitutes a preferred form, it is to be understood that other forms might be adopted, all coming within the scope of the claims which follow.

What is claimed is as follows:

1. A hydraulic drive and control system for a motor vehicle or the like comprising a pump and a fluid motor connected together in a main power circuit, means for adjusting the relative displacements of the pump and motor to vary the ratio of power transmission between them, means responsive to vehicle speed for operating the displacement adjusting means, manual means for changing the setting of the speed responsive means, and adjustable means for controlling the rate of change of relative displacement independently of the speed of manual movement of said manual changing means whereby the rate of acceleration of the vehicle may be controlled.

2. A hydraulic drive and control system for a motor vehicle or the like comprising a pump and a fluid motor connected together in a main power circuit, means including a hydraulic actuator for adjusting the relative displacements of the pump and motor to vary the ratio of power transmission between them, means including a valve controlling said actuator responsive to vehicle speed for operating the displacement adjusting means, manual means for changing the setting of the speed responsive means, and adjustable means including a flow regulating valve for controlling the rate of change of relative displacement independently of the speed of manual movement of said manual changing means whereby the rate of acceleration of the vehicle may be controlled.

3. A hydraulic drive and control system for a motor vehicle or the like comprising a pump and a fluid motor connected together in a main power circuit, means for adjusting the relative displacements of the pump and motor to vary the ratio of power transmission between them in either direction, a by-pass valve connected across the main circuit and operated by said means to by-pass the pump when said means is in neutral position, and a check valve also connected across the main circuit for permitting the fluid motor to overrun the pump, said by-pass valve having means for reversing the connection of the check valve with respect to the main circuit when said means is moved to reverse the direction of the transmission.

4. A hydraulic drive and control system for a motor vehicle or the like having an internal combustion engine and comprising a pump and a fluid motor connected together in a main power circuit, means for adjusting the relative displacements of the pump and motor to vary the ratio of power transmission between them, means responsive to vehicle speed for operating the displacement adjusting means, manual means for changing the setting of the speed responsive means, and means responsive to engine speed changes for adjusting the vehicle speed responsive means.

5. A hydraulic drive and control system for a motor vehicle or the like having an internal combustion engine and comprising a pump and a fluid motor connected together in a main power circuit, means for adjusting the relative displacements of the pump and motor to vary the ratio of power transmission between them, means responsive to vehicle speed for operating the displacement adjusting means, manual means for changing the setting of the speed responsive means, and means responsive to engine load changes for adjusting the vehicle speed responsive means.

6. A hydraulic drive and control system for a motor vehicle or the like having an internal combustion engine and comprising a pump and a fluid motor connected together in a main power circuit, means for adjusting the relative displacements of the pump and motor to vary the ratio of power transmission between them, means responsive to vehicle speed for operating the displacement adjusting means, manual means for changing the setting of the speed responsive means, and means responsive to engine load and speed changes for adjusting the vehicle speed responsive means.

7. A hydraulic drive and control system for a motor vehicle or the like comprising a pump and a fluid motor connected together in a main power circuit, means for adjusting the relative displacements of the pump and motor to vary the ratio of power transmission between them, means responsive to vehicle speed for operating the displacement adjusting means, manual means for changing the setting of the speed responsive means, and means effective to reduce the speed setting of said manual means whenever the horse-power transmitted by the transmission exceeds a predetermined maximum.

8. A hydraulic drive and control system for a motor vehicle or the like having a driven traction wheel and a free-rolling idler wheel comprising a pump and a fluid motor connected together in a main power circuit, means for adjusting the relative displacements of the pump and motor to vary the ratio of power transmission between them, means including a pump, a fluid actuator and a control valve responsive to vehicle speed for operating the displacement adjusting means, manual means for changing the setting of the speed responsive means, and means including a pair of pumps hydraulically connected in series and connected in parallel with said actuator, one connected to each wheel, and responsive to a difference between the speeds of said wheels for limiting the acceleration imparted to the vehicle by operation of the manual means.

HARRY F. VICKERS.
KENNETH R. HERMAN.
WALTER M. POHL.

REFERENCES CITED

The following references are of record in the file of this patent:

UNITED STATES PATENTS

| Number | Name | Date |
|---|---|---|
| 711,662 | Herdman | Oct. 21, 1902 |
| 924,787 | Janney | June 15, 1909 |
| 1,244,629 | Miller | Oct. 30, 1917 |
| 1,294,121 | Lape | Feb. 11, 1919 |
| 1,655,740 | Robson | Jan. 10, 1928 |
| 1,656,544 | Thoma | Jan. 17, 1928 |
| 1,697,253 | Schneider | Jan. 1, 1929 |
| 1,999,288 | Fjellstedt | Apr. 30, 1935 |
| 2,037,373 | Ferris | Apr. 14, 1936 |
| 2,115,097 | Durham | Apr. 26, 1938 |
| 2,275,321 | Scates | Mar. 3, 1942 |
| 2,321,059 | Anderson | June 8, 1943 |
| 2,379,938 | Swanson | July 10, 1945 |